United States Patent [19]
Jeffers

[11] Patent Number: 5,543,911
[45] Date of Patent: Aug. 6, 1996

[54] METHOD OF CURRENCY OR DOCUMENT VALIDATION BY USE OF AN ANTI-COUNTERFEITING MAGNETIC VIEWING STRIP

[75] Inventor: Frederick J. Jeffers, Escondido, Calif.

[73] Assignee: Eastman Kodak Company, Rochester, N.Y.

[21] Appl. No.: 305,228

[22] Filed: Sep. 13, 1994

[51] Int. Cl.$^6$ .................................................. G06K 7/14
[52] U.S. Cl. ............................................................ 356/71
[58] Field of Search ................................................ 356/71

[56] References Cited

U.S. PATENT DOCUMENTS

| | | | |
|---|---|---|---|
| 4,446,204 | 5/1984 | Kaule et al. | 356/71 X |
| 4,514,085 | 4/1985 | Kaye | 356/71 |
| 4,645,301 | 2/1987 | Orensteen et al. | 350/167 |
| 5,059,245 | 10/1991 | Phillips et al. | 106/22 |
| 5,084,351 | 1/1992 | Philips et al. | 428/411.1 |
| 5,169,707 | 12/1992 | Faykish et al. | 428/195 |
| 5,281,480 | 1/1994 | Phillips et al. | 428/412 |

*Primary Examiner*—Vincent P. McGraw
*Attorney, Agent, or Firm*—William F. Noval

[57] ABSTRACT

A method is disclosed to provide a unique indicator of authenticity of currency or a document, optically responsive to a local magnetic field and which employs material difficult to duplicate. The indicator is in the form of magnetic viewing material added to the document either by adherence of a patch or strip of the material, or by printing it directly onto the document's surface. The basic ingredient of the magnetic viewing material is a multitude of minute microcapsules, each having tiny nickel flakes suspended in a viscous fluid encapsulated by a tough, transparent plastic shell. A layer consisting of these micro-capsules has the property that the planes of the nickel flakes will align themselves in the direction of an applied magnetic field. If the field is perpendicular to the layer, the flakes will be seen edge on and will reflect a minimum amount of light. When the field is parallel to the plane of the layer, the planes of the nickel flakes will be parallel to the layer and the nickel flakes now appear as little mirrors reflecting incident light and the layer will appear bright. Hence, the validity of the document can be readily tested by moving a permanent magnet in the vicinity of the patch or strip and noting whether the light patterns reflected from the patch or strip change in response to the magnetic field. Only authentic documents, processed in accordance with the method taught by the invention, will be appropriately responsive.

6 Claims, 2 Drawing Sheets

METHOD OF CURRENCY OR DOCUMENT VALIDATION BY USE OF AN ANTI-COUNTERFEITING MAGNETIC VIEWING STRIP

BACKGROUND OF THE INVENTION

1. Field of the Invention

This invention relates to a method of confirming the validity of a valuable document as protection against counterfeiting, and in particular to a method utilizing a magnetic material whose optical properties change in an applied magnetic field.

2. Description Relative to the Prior Art

The counterfeiting of currency, stocks, bonds, credit cards and other valuable documents essential to the orderly and effective carrying on of business and financial activities is a continuing serious problem. The widespread availability of high quality imaging systems and the increasing technological sophistication of the criminal combine to increase the complexity of combatting all forms of counterfeiting.

Currently, considerable resources are being devoted to the development of devices for incorporation into a document which can be detected to validate the document's authenticity. Holograms, opaque print strips and microprinting are examples of such devices, and their effectiveness depends upon the difficulties involved in counterfeiting them.

It will be noted that while it may be difficult for a criminal to reproduce these countermeasures in his bogus document, generally they are made of readily available materials. With the passage of time, the astute counterfeiter may develop a copying technique and readily obtain the materials needed to counterfeit the document as well as the "anti-counterfeiting" feature itself. The anti-counterfeiting method of the present invention circumvents this problem by use of materials that would be difficult for the typical counterfeiter to duplicate, and for which the sources of supply are limited. This restriction in the availability of the material is a bottleneck through which an aspiring counterfeiter must squeeze, increasing his vulnerability to detection and exposure.

SUMMARY OF THE INVENTION

The present invention resides in a method for incorporating onto the document a unique indicator of authenticity, optically responsive to a local magnetic field and which is made of material difficult to duplicate. The indicator is in the form of magnetic viewing material added to the document either by adherence of a patch or strip of the material, or by printing it directly onto the document's surface. The basic ingredient of the magnetic viewing material is a multitude of minute micro-capsules, each having tiny nickel flakes suspended in a viscous fluid encapsulated by a tough, transparent plastic shell. A layer consisting of these micro-capsules has the property that the planes of the nickel flakes will align themselves in the direction of an applied magnetic field. If the field is perpendicular to the layer, when one views the layer the flakes will be seen edge on and will reflect a minimum amount of light. For a viewer utilizing a clear viscous fluid, the layer will effectively appear dark when viewed against a black background. When the field is parallel to the plane of the layer, the planes of some of the nickel flakes will be parallel to the layer. Looking down onto the layer, the planes of the nickel flakes now appear as little mirrors reflecting incident light and the layer will appear bright. In a currently available magnetic viewing material, the viscous fluid surrounding the micro-capsules is a green ink, and the image formed is dark green where the field is perpendicular to the surface and light green where the field is parallel to the surface. By employing such material, the validity of the document can be readily tested by moving a permanent magnet in the vicinity of the patch or strip and noting whether the light patterns reflected from the patch or strip change in response to the varying magnetic field. Only authentic documents, processed in accordance with the method taught by the invention, will be appropriately responsive.

BRIEF DESCRIPTION OF THE DRAWINGS

The invention will be described with respect to the figures of which.

DESCRIPTION OF THE PREFERRED EMBODIMENTS

Figure 1:
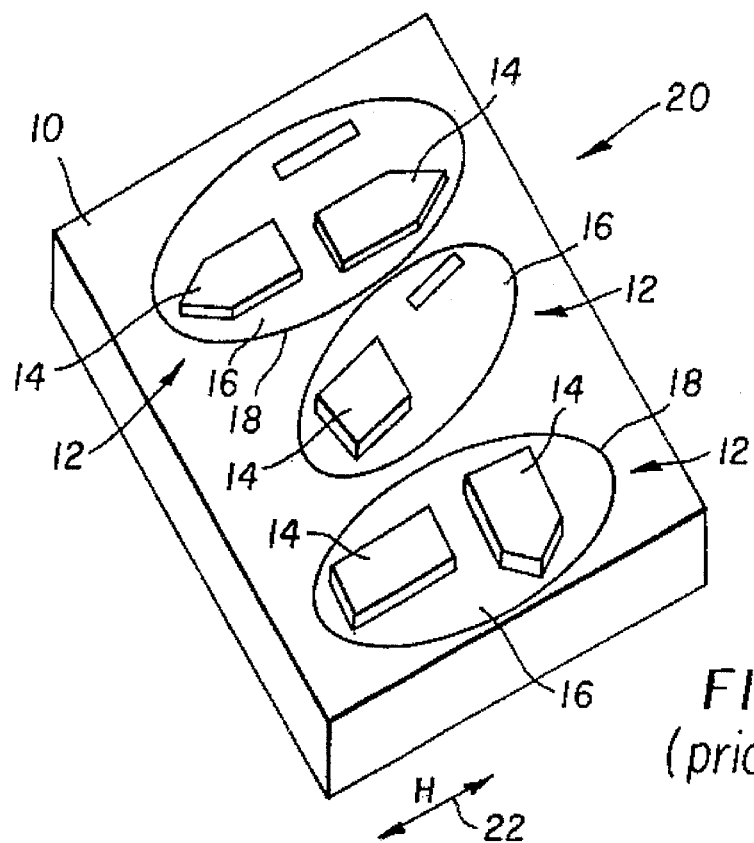
FIG. 1 is a drawing representing a layer of micro-capsules in a magnetic field parallel to the layer.

Referring to FIG. 1, a layer of micro-capsules 12 containing nickel flakes 14 in a viscous liquid 16, each micro-capsule 12 being enclosed in a plastic shell 18, is seen with the planes of the nickel flakes 14 parallel to the plane of the layer 10. Light incident on the layer 10 from the direction 20 will be reflected by the nickel flakes 14, and the layer 10 will appear bright. This orientation of the nickel flakes 14 is accomplished by a magnetic field 22 in the plane of the layer 10.

Figure 2:
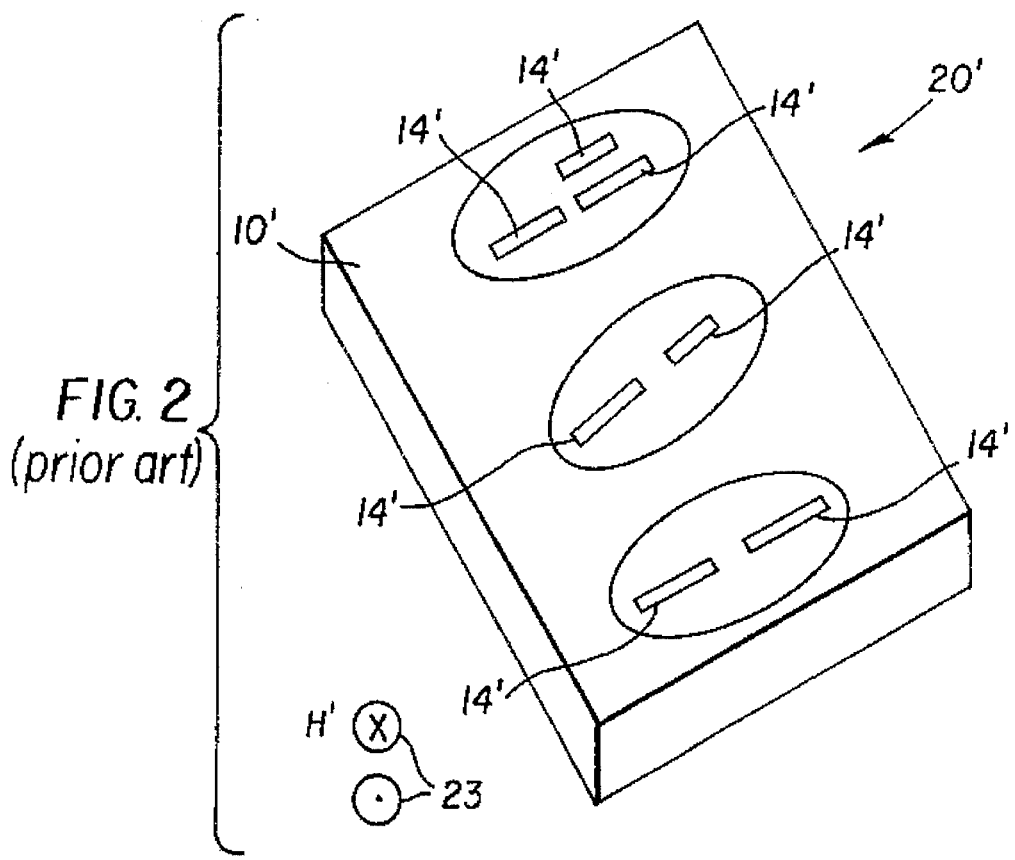
FIG. 2 is a drawing representing a layer of micro-capsules in a magnetic field perpendicular to the layer.

In FIG. 2, the layer 10' is shown with a field H' perpendicular to the layer 10', aligning the nickel flakes 14' perpendicular to the plane of the layer 10'. (In the drawings, different but related elements are identified with the same reference characters, albeit that corresponding elements in various drawings are distinguished by primes.) Light incident on the layer 10' from the direction 20' will not be reflected from the narrow edges of the nickel flakes 14', and the layer 10' will appear dark.

Static magnetic fields having both perpendicular and parallel components will result in variable patterns that are semi-permanent records of the fields previously applied to the layer.

Figure 3:
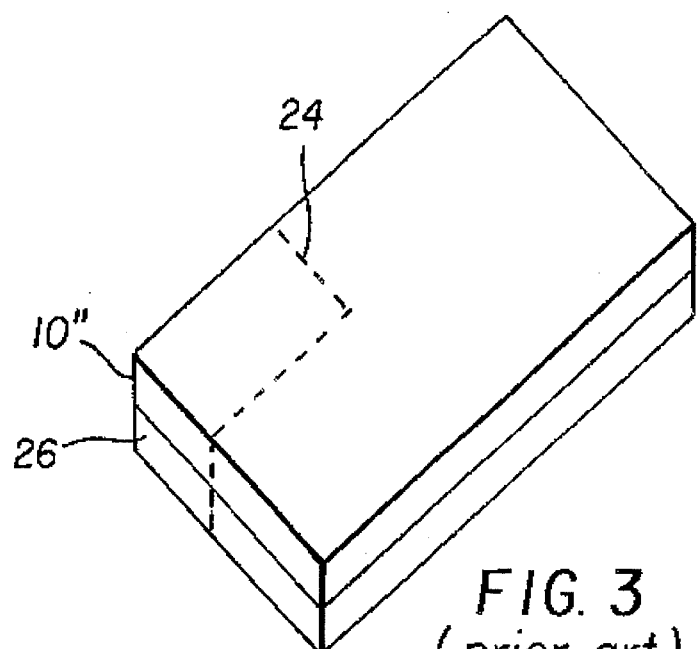
FIG. 3 is a drawing useful in understanding the practice of the invention.
Figure 4:
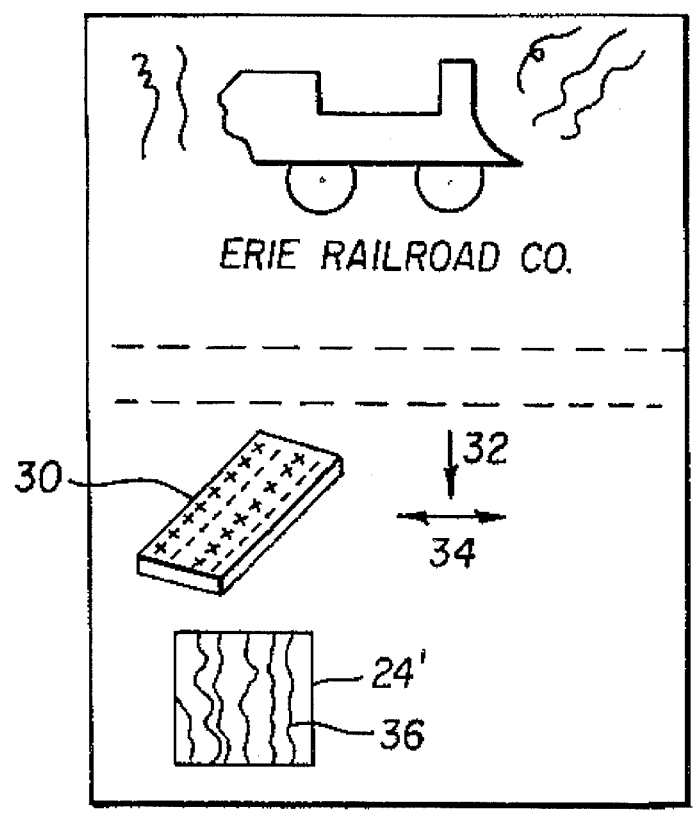
FIG. 4 is a drawing of a document to which the teaching of the method of the invention is applied.

As illustrated in FIG. 3, patch of magnetic viewing material 24' is fabricated by dispersing the micro-capsules 12 in a binder and then coating or painting the dispersion as a layer 10" on a transparent plastic film 26. Plastic sheets having a coating substantially as described, is sold by CD Systems, Inc., Kettering, Ohio 45429. A small portion 24 containing the layer 10" is cut from the transparent film 26 for mounting in an area having a dark background of a document 28, as shown in FIG. 4. A small magnet 30 may be passed over the patch 24' in a sinuous motion combining the directions 32, 34. A rubber refrigerator permanent magnet having a series of alternating magnetic poles is a suitable magnet. The portion 24' responsive to the fields of the magnet 30 will display a visible pattern 36 as previously described.

In a second embodiment, the micro-capsules 12 may be dispersed in a suitable printing ink binder and the magnetic viewing structure printed directly on the document. This embodiment is suitable when the method of the invention is applied to protection of currency or other documents where the printing of the magnetic patch may be integrated into the document printing process itself.

The invention has been disclosed in detail with respect to preferred embodiments thereof, but it will be understood that variations and modifications can be effected within the spirit and the scope of the invention.

What is claimed is:

1. A method for validating the authenticity of currency or a document comprising the steps of:
   a) adhering a portion of a transparent substrate coated with micro-capsules containing magnetic flakes suspended in a liquid onto an area of said currency or said document, and
   b) subjecting said adhered portion to a magnetic field, whereby said magnetic particles in said micro-capsules are oriented into patterns related to the direction of said field, said patterns being optically viewable to determine the authenticity of said currency or document.

2. The method of claim 1 wherein said magnetic field is the field of a permanent magnet.

3. The method of claim 2 wherein said permanent magnet comprises alternating magnetic poles for generating a spatially variable field.

4. A method for validating the authenticity of currency or a document comprising the steps of:
   a) printing a printed area onto said currency or document by means of a printing ink including micro-capsules containing magnetic flakes suspended in a liquid, and
   subjecting said printed area to a magnetic field, whereby said magnetic particles in said micro-capsules are oriented into patterns related to the direction of said field, said patterns being optically viewable to determine the authenticity of said currency or document.

5. The method of claim 4 wherein said magnetic field is the field of a permanent magnet.

6. The method of claim 5 wherein said permanent magnet comprises alternating magnetic poles for generating a spatially variable field.

\* \* \* \* \*